United States Patent

Hodder et al.

[15] 3,683,131

[45] Aug. 8, 1972

[54] MAGNETIC TAPE RECORDING CIRCUIT

[72] Inventors: Wayne K. Hodder, Glendora; Lewis B. Browder, Arcadia, both of Calif.

[73] Assignee: Bell & Howell Company, Chicago, Ill.

[22] Filed: June 28, 1965

[21] Appl. No.: 467,650

[52] U.S. Cl. ....179/100.2 K, 340/174.1 G, 346/74 M

[51] Int. Cl. .......................................G11b 5/44

[58] Field of Search................340/174.1 F, 174.1 G; 346/74 MC; 179/100.2 C, 100.2, 100.2 K

[56] References Cited

UNITED STATES PATENTS

| | | | |
|---|---|---|---|
| 2,579,125 | 12/1951 | Perreau | 179/100.2 |
| 2,876,296 | 3/1959 | Youngquist | 179/100.2 |
| 2,929,019 | 3/1960 | Bryan et al. | 340/174.1 |
| 3,165,592 | 1/1965 | Brette | 179/100.2 |
| 3,335,412 | 8/1967 | Matsumoto | 179/100.2 |
| 2,536,272 | 1/1951 | Friend | 179/100.2 C |
| 2,649,506 | 8/1953 | Gayford et al. | 179/100.2 K |
| 2,816,281 | 12/1957 | Aronson | 179/100.2 |
| 2,868,890 | 1/1959 | Camras | 179/100.2 K |
| 2,886,659 | 5/1959 | Schroeder | 330/102 |
| 3,029,317 | 4/1962 | Davidson | 179/100.2 |
| 2,588,915 | 3/1952 | Erikson | 179/100.2 |
| 2,969,528 | 1/1961 | Chew | 340/174.1 |

OTHER PUBLICATIONS

Outside Coil Magnetic Head Improves High Frequency Recording - Camras et al., Electronics Magazine June 61 (pages 89- 91)

Magnetic Drum Recording - Corkutt, Western Union Technical Review, Oct. 1960 (Pages 136- 143)

*Primary Examiner*—J. Russell Goudeau

*Attorney*—Christie, Parker & Hale

[57] ABSTRACT

There is described a recording amplifier circuit for a magnetic recorder providing a very low output impedance in series with the winding on the magnetic recording head. The low output impedance is achieved by negative feedback, preferably derived from the voltage across the drive coil or derived from a separate coil on the magnetic head wound concentrically with the drive coil.

7 Claims, 4 Drawing Figures

PATENTED AUG 8 1972 3,683,131

INVENTORS.
WAYNE K. HODDER
LEWIS B. BROWDER
BY
Christie, Parker & Hale
ATTORNEYS.

MAGNETIC TAPE RECORDING CIRCUIT

This invention relates to magnetic tape recording and, more particularly, is concerned with an improved recording amplifier circuit.

In magnetic tape recording systems requiring accurate reproduction of a recorded signal, such as an instrumentation recording system, frequency and phase correction networks have been required in the recording and playback circuits to compensate for magnetic losses in the recording head, stray capacitance as well as non-linear magnetic head transfer characteristics to the tape. The main source of frequency and phase distortion in magnetic heads is due to parasitic flux developed within the core material by all forms of losses such as eddy current losses and magnetic domain wall friction. Magnetic coupling to the intertrack shields in multiple track heads may also produce undesirable flux generation. Stray capacitance across the head may form a second source of current flow that modifies the net head flux in conventional recording methods. As a result, during recording, the core flux, and hence the gap flux, does not always follow the record current where current from a high impedance source is used as the measure of net flux. The usual method of compensating for the effects of magnetic core losses is to increase the signal level into the driver amplifier so that the output current from the drive amplifier is increased sufficiently to compensate for the flux reduction within the head with increase in frequency. However, it is difficult to match the compensation with the non-linearities introduced by the recording head. Effective compensation by this technique requires that the actual values of the equivalent parallel parasitic impedances be known over the recording frequency range, which is difficult to ascertain.

The present invention provides an improved magnetic recording circuit which provides automatic compensation such that the flux is precisely maintained at all frequencies because the output current driving the head automatically increases when required. Compensation is correct in phase as well as magnitude regardless of the complexity of the parasitic impedances involved. Furthermore, the accuracy of the correction is independant of the values of the head magnetic properties and the magnitude of the stray capacitance, thereby reducing the production tolerances and environmental tolerances which otherwise affect the recording performance.

The advantages of the present invention are achieved by driving the recording head from a drive amplifier having a very low output impedance, preferably less than an ohm. The low output impedance of the drive amplifier may be achieved by negative feedback which, according to the preferred embodiment of the invention is derived from the voltage across the drive coil of the magnetic head, but may be derived from a separate coil on the magnetic head wound concentrically with the drive coil on the magnetic head or wound on the core adjacent the recording gap. By providing a very low output impedance, the driver amplifier appears as a voltage source since the voltage across the coil depends only upon the net coil flux. By making all series impedances essentially zero, the coil voltage is maintained equal to amplifier output voltage. This means that the amplifier current automatically adjusts to compensate for all changes in parasitic currents and/or changes in magnetic core flux.

For a more complete understanding of the invention, reference should be made to the accompanying drawings, wherein.

Figure 1:
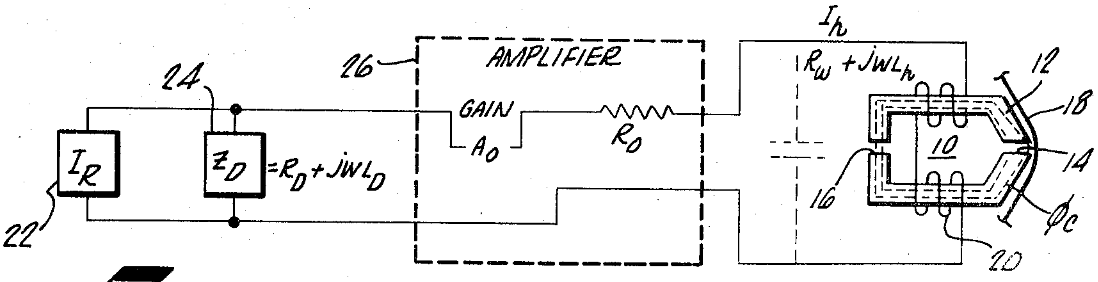
FIG. 1 is a schematic block diagram showing the principles of the present invention.

Referring to FIG. 1 in detail, the numeral 10 indicates generally a magnetic recording head having a magnetic core 12 with a recording gap 14 and a back gap 16. Magnetic tape 18 moves past the recording gap 14 in conventional manner. The magnetic head is provided with a coil winding 20 which preferably is wound with a minimum series resistance $R_w$ and with relatively high inductance $L_h$.

A signal source 22 which generates a record current $I_R$ is connected across a differentiating network 24 having a shunt impedance $Z_D = R_D + jwL_D$. The differentiating circuit 24 is provided because the head flux is proportional to the integral of the applied voltage across the recording coil 20. Since the circuit is designed to maintain constant voltage across the recording head at any particular frequency, the differentiating circuit provides an increase in voltage with frequency such that the flux in the head is maintained substantially constant with frequency.

After differentiation, the record signal is applied to an amplifier 26 having a gain $A_o$ and an output impedance $R_o$ which is made very small so as to be effectively equal to zero.

Analyzing the above circuit, the head current $I_h$ may be expressed as $$I_h = \frac{E_R A_o}{(R_o + R_w) + jwL_h} \tag{1}$$

where $E_R$ is the input voltage to the amplifier. Assuming the input impedance of the amplifier 26 is large compared to $Z_D$, $$E_R = I_R (R_D + jwL_D) \tag{2}$$

Combining, $$I_h = I_R A_o \frac{jwL_D\left(1 + \frac{R_D}{jwL_D}\right)}{jwL_h\left(1 + \frac{R_o + R_w}{jwL_h}\right)} \tag{3}$$

By making the ratio $$(R_o + R_w)/jwL_h << 1 \tag{4}$$

and likewise, by making the ratio $$R_D/jwL_D << 1 \tag{5}$$

then, by combining equations (4) and (5) with (3), produces the following expression $$I_h L_h = I_R A_o L_D \tag{6}$$

Thus, it will be seen that by making the ratio of resistance $(R_o + R_w)$ to inductive reactance $jwL_h$ as small as practical, the product of head inductance and head current is maintained proportional to the signal input $I_R$. By comparison, the usual method of recording is to make only the head current $I_h$ proportional to the input signal, whereas by the present invention, the head current automatically changes with changes in effective inductance of the head so as to compensate for losses and non-linearities over the operating frequency band.

The significance of controlling the product ($I_hL_h$) is that the head flux is maintained proportional to input signal, as shown below.

Since the head flux $\phi_c$ is related to the integral of the voltage $V_h$ across the drive coil 20 having $N$ turns, and since it is assured $R_w/jwL_h << 1$, then according to Faraday's Law of Induction, expressed in complex notation, $$\phi_c = V_h/jwN \quad (7)$$

Since the head voltage is related to the rate of change of the head current $$V_h = jw(I_hL_h) \quad (8)$$

combining equations (8) and (7) gives $$\phi_c = (I_hL_h)/N \quad (9)$$

Now, by combining equation (9) with (6), it will be seen that $$\phi_c = I_RA_oL_D/N \quad (10)$$

This expression clearly shows that the head flux is proportional to the input signal $I_R$ and independent of the value of the head inductance.

The impedance $Z_D$, which is the differentiating circuit 24, provides a correction for the effects of resistance in the drive coil and compensates for the fact that for given voltage across the coil, the flux drops off with increase in frequency at the rate of 6 db per octave.

Figure 2:
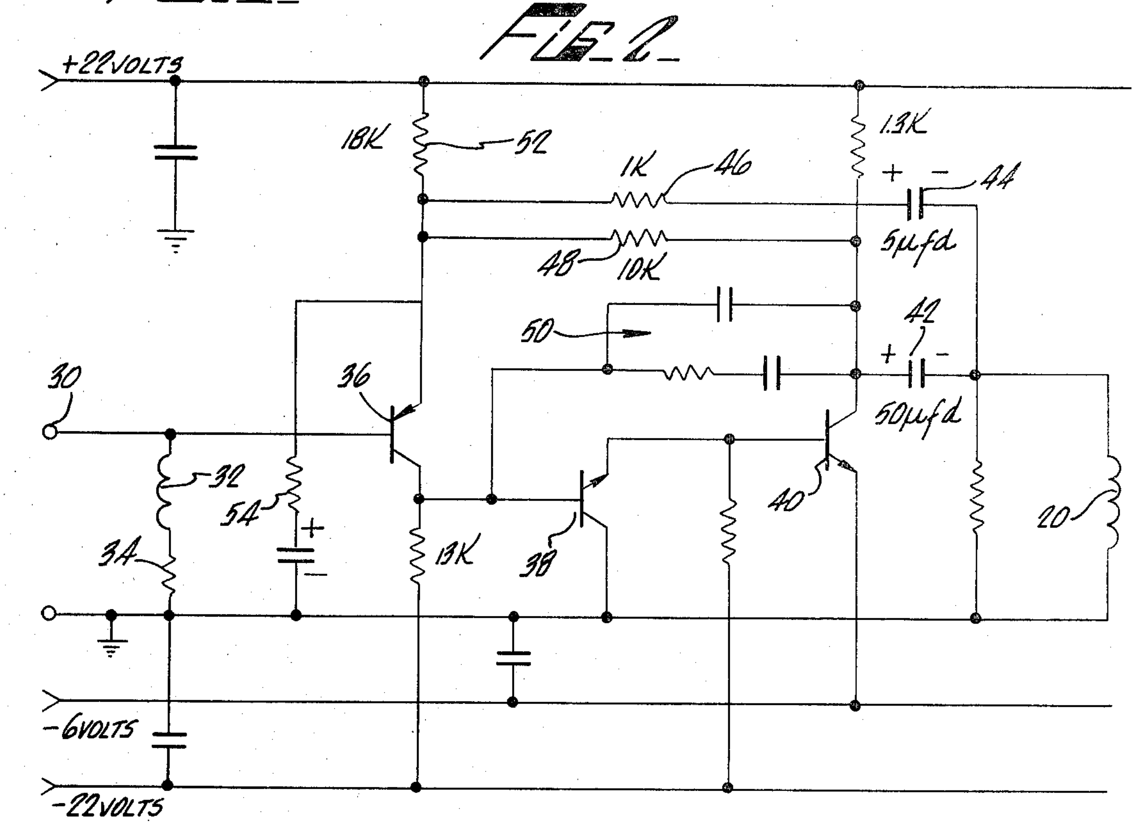
FIG. 2 is a schematic circuit diagram of one embodiment of the present invention.

A practical circuit for a record amplifier incorporating the features of the present invention is shown in FIG. 2. The input signal from a suitable high impedance source is applied between ground and an input terminal. A differentiating network including an inductance 32 and small series resistance 34 is connected between the input terminal and ground to provide the impedance $Z_D$ of FIG. 1. The drive amplifier includes three transistor stages indicated at 36, 38 and 40 which are direct coupled, the output being derived from the collector of the transistor 40 through a large coupling capacitor 42 and connected across the head coil 20.

A low output impedance of the order of 1 ohm or less over the operating frequency range is obtained by negative feedback provided through a large coupling capacitor 44 and series resistor 46 coupling the voltage developed across the head 20 back to the emitter of the input stage 36. To provide transistor dc bias stability, a larger feedback resistor 48 connects the collector of the output stage 40 back to the emitter of the input stage 36. In addition, a feedback loop is provided by a network 50 coupling the collector of the output transistor stage 40 to the input of the second transistor stage 38 to improve the stability of the amplifier and to prevent oscillations within the operating frequency band. A resistor 52 and a resistor 54 provide a voltage dividing network for the emitter of the first transistor stage 36.

With the large negative feedback arrangement of the circuit of FIG. 2, the output impedance of the driver amplifier is effectively very small so that any change in inductance of the head 20 does not affect the voltage, and the coil current automatically adjusts to cancel the effects of currents produced by stray admittances in the recording head.

In the arrangement of FIG. 2, the feedback signal is derived from the voltage across the head coil itself. In practice, if the only concern is head losses, extremely low series resistance of the head is not essential because these losses are significant only at the higher frequencies where $R_w/jwL_h$ is small compared to one. Since at the lower frequencies the head inductance $L_h$ is also a constant, the resistance $R_D$ of the differentiation circuit is made to satisfy the equation $$R_D = \frac{(R_o + R_w)L_D}{L_h} \quad (11)$$

By combining with equation (3)

$$I_h = I_rA_o(L_D/L_h) \quad (12)$$

Equation (12) is valid even though $\frac{R_w}{jwL_h} \gg 1$, provided $L_h$ is a constant. It will be noted that equation (12) and equation (6) are the same and therefore valid for the full frequency range, i.e., for the low frequency range where $L_h$ is constant and the finite values of the circuit element satisfy equation (11), and also for the higher frequencies where the ratios of resistance to reactance of equations 4 and 5 are very small but the finite circuit values of the head may not be constant.

Figure 3:
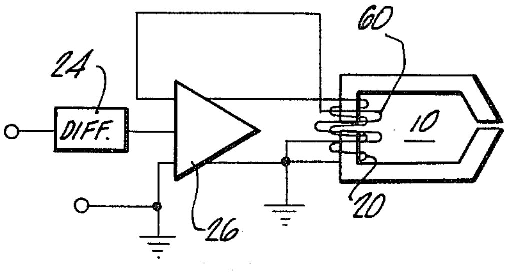
FIG. 3 is a modified embodiment of the present invention.
Figure 4:
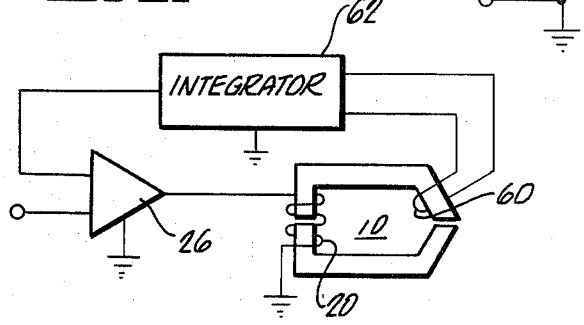
FIG. 4 is yet another modification of the present invention.

To compensate for non-linearities in the storage transfer characteristic of the head, it is necessary that the resistance of the head coil across which the feedback voltage is derived be made as small as possible to reduce the voltage drop across the coil due to the drive current. However, if it is difficult because of space limitations to wind low resistance coils on the recording head, or in applications where very low frequency operation is desired, this problem may be overcome by winding a separate coil 60 on the head from which the feedback signal is derived, such as shown in the arrangements of FIGS. 3 and 4. The feedback coil 60 is either wound concentrically with the drive coil or may be wound adjacent the front gap. By providing a separate feedback coil, the current in the feedback coil can be made very small, thereby making the IR drop across the feedback coil very small in relation to the voltage induced in the feedback coil by the flux in the core. The voltage generated across the second coil follows the non-linearities in the flux generated in the core because this coil does not carry the head current $I_h$. Since the voltage drop given by product $I_hR_w$ is not fed back into the amplifier, the feedback correction is independent of the resistance $R_w$. The feedback winding adjacent the gap has the advantage that it senses the flux at the gap and therefore provides a more accurate response to the tape magnetizing field.

The feedback from the second coil may be coupled through an integrator network 62, as further shown in FIG. 4. This provides a feedback voltage at the output of the integrator which is proportional to the total flux in the core rather than the rate of change of flux in the core, giving a flatter frequency response characteristic.

If the integration is provided in the feedback, differentiation of the input signal in the manner described in connection with FIGS. 1 and 2 is not needed.

What is claimed is:

1. Apparatus for recording a signal on magnetic tape comprising a recording head including a magnetic core having a recording gap and a drive coil of low resistance wound on the core, a source of signals to be recorded, and a drive amplifier coupling the source to the drive coil, the drive amplifier providing a two-terminal output impedance connected directly across the drive coil of the recording head, the total resistance of the output impedance of the amplifier, the connection between the head coil and the amplifier, and the resistance of the coil being small compared to the inductive reactance of the head coil over the operating frequency range of the recorded signal.

2. Apparatus as defined in claim 1 wherein the output impedance of the drive amplifier presents less than one ohm in series with the drive coil.

3. Apparatus as defined in claim 1 wherein the small output impedance is provided by a negative feedback circuit connected across the coil and coupled to the amplifier input.

4. Apparatus as defined in claim 1 wherein the recording head includes a second coil wound on the core, the small output impedance being provided by a negative feedback circuit connected across the second coil and coupled to the amplifier input.

5. Apparatus as defined in claim 4 wherein the second coil is wound concentrically with the drive coil.

6. Apparatus as defined in claim 4 wherein the second coil is wound on the core adjacent the recording gap.

7. Apparatus as defined in claim 4 wherein the negative feedback circuit includes an integrating network.

* * * * *